(12) United States Patent
Pang

(10) Patent No.: US 11,480,753 B2
(45) Date of Patent: Oct. 25, 2022

(54) LENS MODULE

(71) Applicant: TRIPLE WIN TECHNOLOGY(SHENZHEN) CO.LTD., Shenzhen (CN)

(72) Inventor: Si-Ling Pang, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 18 days.

(21) Appl. No.: 16/940,699

(22) Filed: Jul. 28, 2020

(65) Prior Publication Data
US 2021/0294063 A1 Sep. 23, 2021

(30) Foreign Application Priority Data
Mar. 20, 2020 (CN) .......................... 202010202819.1

(51) Int. Cl.
G02B 7/02 (2021.01)
G02B 27/42 (2006.01)

(52) U.S. Cl.
CPC ............ *G02B 7/022* (2013.01); *G02B 7/025* (2013.01); *G02B 27/4205* (2013.01)

(58) Field of Classification Search
CPC ....... G02B 7/022; G02B 7/025; G02B 7/4205
USPC ......................................... 359/558
See application file for complete search history.

(56) References Cited

U.S. PATENT DOCUMENTS

| 5,208,700 | A | * | 5/1993 | Harris | G02B 5/18 359/558 |
| 6,829,093 | B1 | * | 12/2004 | Nakai | G02B 5/1876 359/570 |
| 8,755,117 | B2 | * | 6/2014 | Kobayashi | A61F 2/1602 359/569 |
| 2002/0005996 | A1 | * | 1/2002 | Kitamura | G02B 13/18 359/819 |
| 2003/0058538 | A1 | * | 3/2003 | Sugiyama | G02B 5/18 359/570 |
| 2004/0130807 | A1 | * | 7/2004 | Hattori | G02B 7/022 359/811 |
| 2007/0002446 | A1 | * | 1/2007 | Takeuchi | G02B 3/08 359/569 |
| 2014/0268341 | A1 | * | 9/2014 | Tam | G02B 5/1876 359/558 |

FOREIGN PATENT DOCUMENTS

JP 3095434 U 7/2003

* cited by examiner

*Primary Examiner* — Collin X Beatty
(74) *Attorney, Agent, or Firm* — ScienBiziP, P.C.

(57) ABSTRACT

A lens module includes a diffractive optical element, a lens, and a plurality of positioning elements, the diffractive optical element and the lens are matched and positively held together. First positioning grooves are defined in the diffractive optical element, and corresponding second positioning grooves are defined in the lens which is stacked on the diffractive optical element. Each positioning element is fixed in and entirely within a first positioning groove and a second positioning groove to fix and hold the diffractive optical element and the lens together.

10 Claims, 2 Drawing Sheets

LENS MODULE

FIELD

The subject matter herein generally relates to imaging, in particular to a lens module.

BACKGROUND

A conventional lens module includes a diffractive optical element and a lens. The diffractive optical element is adhered to the lens by adhesive sandwiched between surfaces of the diffractive optical element and the lens. However, such method of fixing can allow the diffractive optical element and the lens to shift in relation to each other, or even to separate.

BRIEF DESCRIPTION OF THE DRAWINGS

Implementations of the present technology will now be described, by way of embodiment, with reference to the attached figures.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Terms used herein in the specification of the present disclosure are only for the purpose of describing specific embodiments, and not intended to limit the present disclosure. When one component is considered as "being fixed to" or "being connected to" another component, the one component may be fixed directly to the other component or an intermediate component might be present simultaneously. When a component is referred to as "being disposed on" another component, the component may be disposed on the other component or an intermediate component might be present simultaneously.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Figure 1:
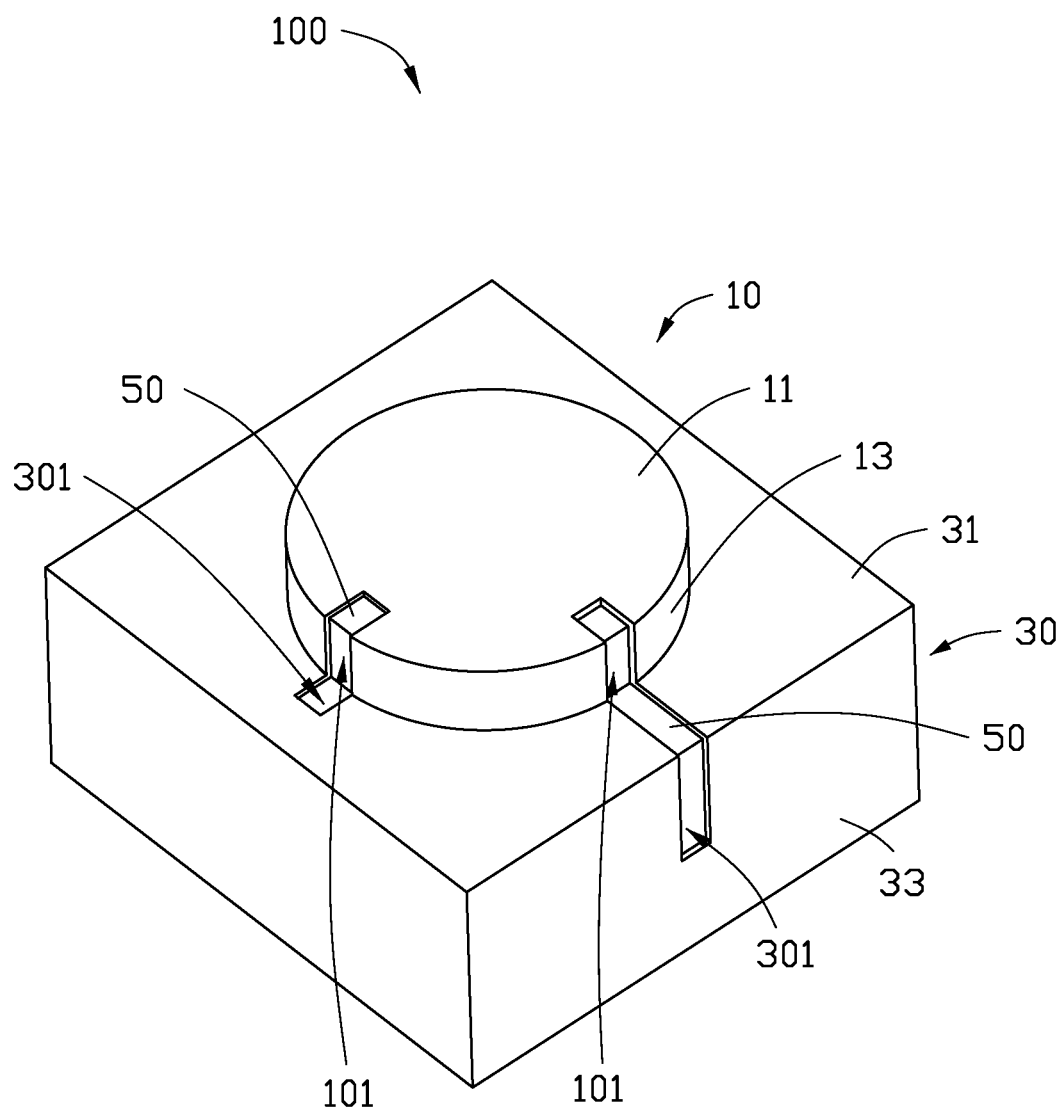
FIG. 1 is an isometric view of a lens module in accordance with an embodiment.

FIG. 1 illustrates an embodiment of a lens module 100. The lens module 100 includes a diffractive optical element 10, a lens 30, and a plurality of positioning elements 50 connecting the diffractive optical element 10 and the lens 30. The diffractive optical element 10 is stacked on a surface of the lens 30. The diffractive optical element 10 defines a plurality of first positioning grooves 101. The lens 30 defines a plurality of second positioning grooves 301 corresponding one-to-one with the plurality of first positioning grooves 101. Each of the positioning elements 50 is fixed in and entirely within one of the first positioning grooves 101 and one of the second positioning grooves 301 to fix together and lock in place the diffractive optical element 10 and the lens 30.

The diffractive optical element 10 includes a top surface (not shown), a bottom surface 11, and a lateral surface 13 connecting the top surface and the bottom surface 11. Each of the first positioning grooves 101 is defined on the bottom surface 11 and extends to the lateral surface 13. The lens 30 includes a first surface 31, a second surface (not shown) opposite to the first surface 31, and a third surface 33 connecting the first surface 31 and the second surface. The first surface 31 is in contact with the top surface of the diffractive optical element 10. Each of the second positioning grooves 301 may be defined on the first surface 31 or on the first surface 31 and the third surface 33. In the embodiment, some of the second positioning grooves 301 are defined on the first surface 31, and the remaining second positioning grooves 301 are defined on the first surface 31 and extend to the third surface 33.

Each of the first positioning grooves 101 has a L-shaped cross section, and each of the second positioning grooves 301 has a L-shaped cross section, each of the positioning elements 50 being stepped.

Each of the positioning elements 50 further adheres to the diffractive optical element 10 and the lens 30 by an adhesive (not shown) coated on a sidewall of one of the first positioning grooves 101 and a sidewall of one of the second positioning grooves 301. The adhesive is located in one of the first positioning grooves 101, and one of the second positioning grooves 301 allows the amount of the adhesive used to be increased, to improve the bonding strength. A distance between a side edge of each of the positioning elements 50 and the sidewall of one of the first positioning grooves 101 is more than 0.3 mm, and a distance between a side edge of each of the positioning elements 50 and the sidewall of one of the second positioning grooves 301 is more than 0.3 mm, avoiding an overflow of the adhesive.

Figure 2:
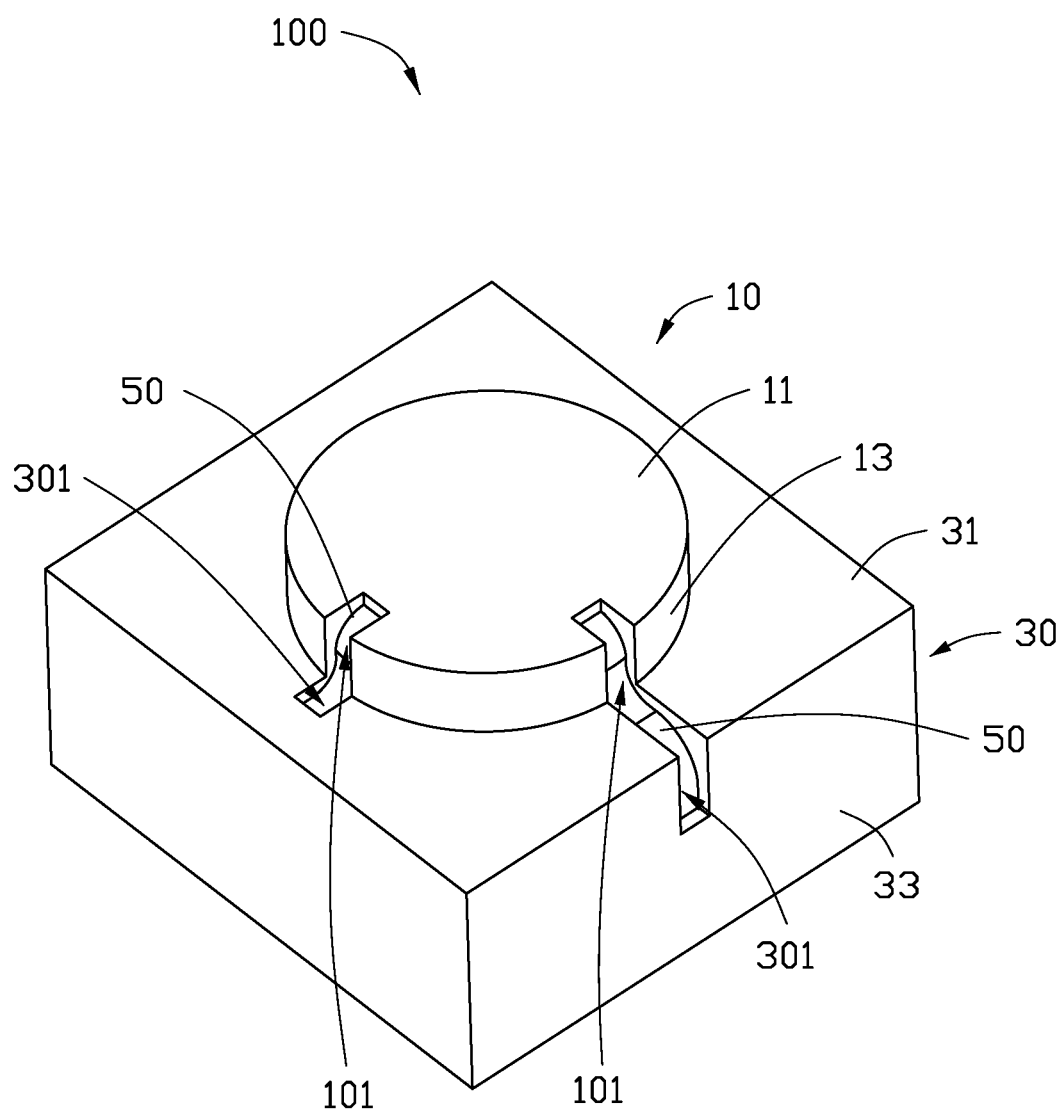
FIG. 2 is an isometric view of a lens module in accordance with another embodiment.

Referring to FIG. 2, a bottom wall (not shown) of each of the first positioning grooves 101 is curved, a bottom wall (not shown) of each of the second positioning grooves 301 is curved, and each of the positioning elements 50 is wavy.

It is to be understood, the positioning elements 50 can be other non-limited shapes according to needs, as long as the shape of each of the positioning elements 50 is matched with the combined shape of one of the first positioning grooves 101 and one of the second positioning grooves 301 for locating purposes. In some embodiments, the positioning elements 50 are polyline-shaped, and the bottom walls of the first positioning grooves 101 are inclined relative to the bottom surface 11 or the lateral surface 13, the bottom walls of the second positioning grooves 301 are inclined relative to the first surface 31. In some embodiment, the positioning elements 50 are irregular, and the bottom walls of the first positioning grooves 101 and the second positioning grooves 301 are irregular.

In the lens module 100, areas of the diffractive optical element 10 are concave and define the first positioning grooves 101, and areas of the lens 30 are concave and define the second positioning grooves 301 corresponding to the first positioning grooves 101. Each of the positioning elements 50 is fixed in one of the first positioning grooves 101 and in one of the second positioning grooves 301, so that the diffractive optical element 10 is firmly held and cannot separate from the lens 30.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A lens module comprising
a diffractive optical element defining a plurality of first positioning grooves;
a lens stacked on the diffractive optical element and defining a plurality of second positioning grooves corresponding one-to-one to and communicating with the plurality of first positioning grooves; and
a plurality of positioning elements;
wherein each of the plurality of positioning elements is fixed in and entirely within one of the first positioning grooves and one of the second positioning grooves to fix the diffractive optical element and the lens together, a part of each of the plurality of positioning elements is entirely accommodated in one of the first positioning grooves, and other parts of each of the plurality of positioning elements is entirely accommodated in one of the second positioning grooves.

2. The lens module of claim 1, wherein the diffractive optical element comprises a top surface, a bottom surface and a lateral surface connecting the top surface and the bottom surface, each of the plurality of first positioning grooves is defined on the bottom surface and extends to the lateral surface; the lens comprises a first surface in touch with the top surface, a second surface opposite to the first surface, and a third surface connecting the first surface and the second surface, at least one of the plurality of second positioning grooves is defined on the first surface.

3. The lens module of claim 2, wherein at least one of the plurality of second positioning grooves is defined on the first surface and extends to the third surface.

4. The lens module of claim 3, wherein each of the plurality of first positioning grooves has a L-shaped cross section, each of the plurality of second positioning grooves has a L-shaped cross section, and each of the plurality of positioning elements is stepped.

5. The lens module of claim 4, wherein a bottom wall of each of the plurality of first positioning grooves is curved, a bottom wall of each of the plurality of second positioning grooves is curved, and each of the plurality of positioning elements is wavy.

6. The lens module of claim 2, wherein a bottom wall of each of the plurality of first positioning grooves is inclined relative to the bottom surface or the lateral surface, a bottom wall of each of the plurality of second positioning grooves is inclined relative to the first surface or the third surface, and each of the plurality of positioning elements is polyline-shaped.

7. The lens module of claim 3, wherein a bottom wall of each of the plurality of first positioning grooves is inclined relative to the bottom surface or the lateral surface, a bottom wall of each of the plurality of second positioning grooves is inclined relative to the first surface or the third surface, and each of the plurality of positioning elements is polyline-shaped.

8. The lens module of claim 2, wherein bottom walls of each of the plurality of first positioning grooves and each of the plurality of second positioning grooves are irregular, and each of the plurality of positioning elements is irregular.

9. The lens module of claim 1, wherein each of the plurality of positioning elements is adhered to the diffractive optical element and the lens by an adhesive in one of the plurality of first positioning grooves and one of the plurality of second positioning grooves.

10. The lens module of claim 9, wherein a distance between a side edge of each of the plurality of positioning elements and a sidewall of one of the plurality of first positioning grooves is more than 0.3 mm, and a distance between a side edge of each of the plurality of positioning element and a sidewall of one of the plurality of second positioning grooves is more than 0.3 mm.

* * * * *